(12) United States Patent
Halvorson

(10) Patent No.: US 8,210,770 B2
(45) Date of Patent: Jul. 3, 2012

(54) BOOM ASSEMBLY FOR HOLDING HOSE OUTPUTTING LIQUEFIED PAVING MATERIAL

(75) Inventor: Michael Stuart Halvorson, Plymouth, MN (US)

(73) Assignee: Cimline, Inc., Minneapolis, MN (US)

( * ) Notice: Subject to any disclaimer, the term of this patent is extended or adjusted under 35 U.S.C. 154(b) by 404 days.

(21) Appl. No.: 12/504,734

(22) Filed: Jul. 17, 2009

(65) Prior Publication Data

US 2010/0014918 A1 Jan. 21, 2010

Related U.S. Application Data

(60) Provisional application No. 61/081,828, filed on Jul. 18, 2008.

(51) Int. Cl.
*E01C 19/16* (2006.01)

(52) U.S. Cl. ............ 404/95; 404/111; 222/74; 222/527; 222/533; 137/615

(58) Field of Classification Search ............. 404/92, 404/95, 101, 108, 111; 222/74, 527, 533; 137/615

See application file for complete search history.

(56) References Cited

U.S. PATENT DOCUMENTS

| | | | | |
|---|---|---|---|---|
| 1,165,582 | A | * | 12/1915 | Falk et al. ............. 137/615 |
| 1,478,925 | A | * | 12/1923 | Steed ................ 137/615 |
| 1,924,636 | A | | 8/1933 | Burket |
| 2,948,306 | A | * | 8/1960 | Kuraeff ............. 141/231 |
| 3,096,225 | A | | 7/1963 | Carr et al. |
| 3,507,126 | A | | 4/1970 | Rochelle et al. |
| 3,517,519 | A | | 6/1970 | Kolb et al. |
| 3,572,380 | A | | 3/1971 | Jackson et al. |
| RE27,420 | E | | 7/1972 | Rochelle et al. |
| 4,202,372 | A | * | 5/1980 | Gibbons ............. 137/615 |
| 4,299,262 | A | | 11/1981 | Andrepont |
| 4,468,166 | A | * | 8/1984 | Jameson ............. 414/690 |
| 4,502,505 | A | * | 3/1985 | Moller ............. 137/615 |
| 4,564,224 | A | | 1/1986 | Korus |
| 4,625,760 | A | * | 12/1986 | Mertens ............. 137/615 |
| 4,774,979 | A | | 10/1988 | McKeon et al. |
| 4,781,403 | A | | 11/1988 | Durnil |
| 4,820,078 | A | | 4/1989 | Brocious |
| 5,006,012 | A | | 4/1991 | Sterner |
| 5,232,306 | A | | 8/1993 | Sterner |
| 5,263,790 | A | | 11/1993 | Bickley et al. |
| 5,419,654 | A | | 5/1995 | Kleiger |

(Continued)

*Primary Examiner* — Gary S Hartmann
(74) *Attorney, Agent, or Firm* — Alan Kamrath; Kamrath IP Lawfirm, PA

(57) ABSTRACT

A hose holder boom assembly (10) includes a first pivotal connector (128) pivotally mounting an open end (122) of a first tube (120) to a sidewall (114) of a cabinet (44) about a first pivot axis. A second pivotal connector (128) mounts an open end (132) of a second tube (130) to the other open end (124) of the first tube (120) about a second pivot axis parallel to and spaced from the first pivot axis. Movement of the first tube (120) relative to the sidewall (114) and relative movement between the first and second tubes (120, 130) are limited to a pivot plane extending perpendicular to the first and second pivot axes and including the first and second tubes (120, 130). The open end (132) of the second tube (130) is pivotable at an obtuse angle to each of two sides of the other open end (124) of the first tube (120). A hose (74) for outputting paving material extends out of the cabinet (44) and through the first and second tubes (120, 130) and the first and second pivotal connectors (128).

19 Claims, 4 Drawing Sheets

U.S. PATENT DOCUMENTS

| | | | |
|---|---|---|---|
| 5,906,471 A * | 5/1999 | Schwoerer | 414/505 |
| 6,109,826 A | 8/2000 | Mertes | |
| 6,315,500 B1 | 11/2001 | Goodman et al. | |
| 6,588,448 B1 * | 7/2003 | Raymond | 137/351 |
| 6,698,451 B2 * | 3/2004 | Anderson et al. | 137/615 |
| 6,701,980 B2 * | 3/2004 | Rothrock | 141/231 |
| 6,719,009 B1 * | 4/2004 | Bissen et al. | 137/615 |
| 6,883,532 B2 * | 4/2005 | Rau | 137/1 |
| 7,128,094 B2 * | 10/2006 | Anderson et al. | 137/615 |
| 7,481,601 B2 | 1/2009 | Gilchrist | |
| 2002/0015618 A1 * | 2/2002 | Quenzi et al. | 404/75 |
| 2010/0313977 A1 * | 12/2010 | Sylard | 137/615 |

* cited by examiner

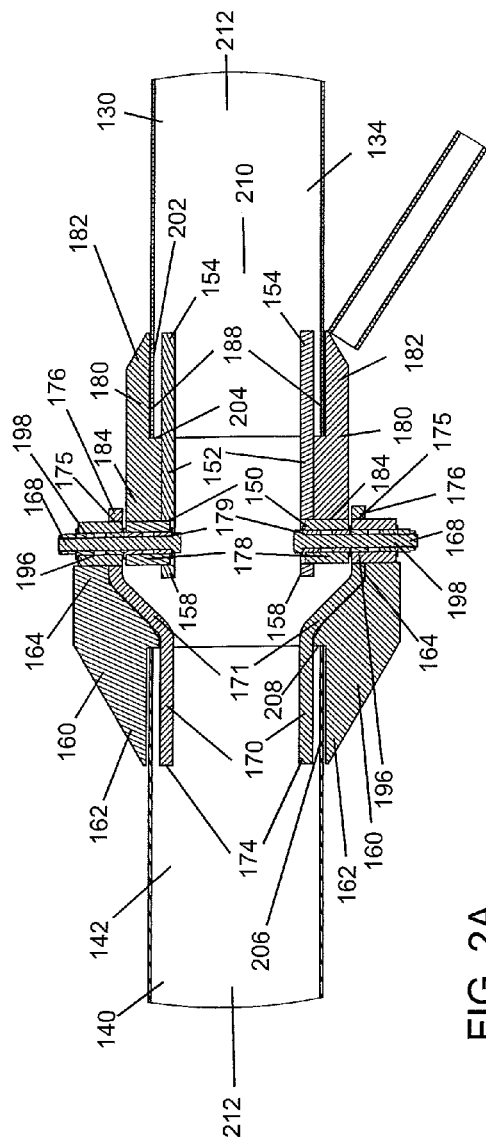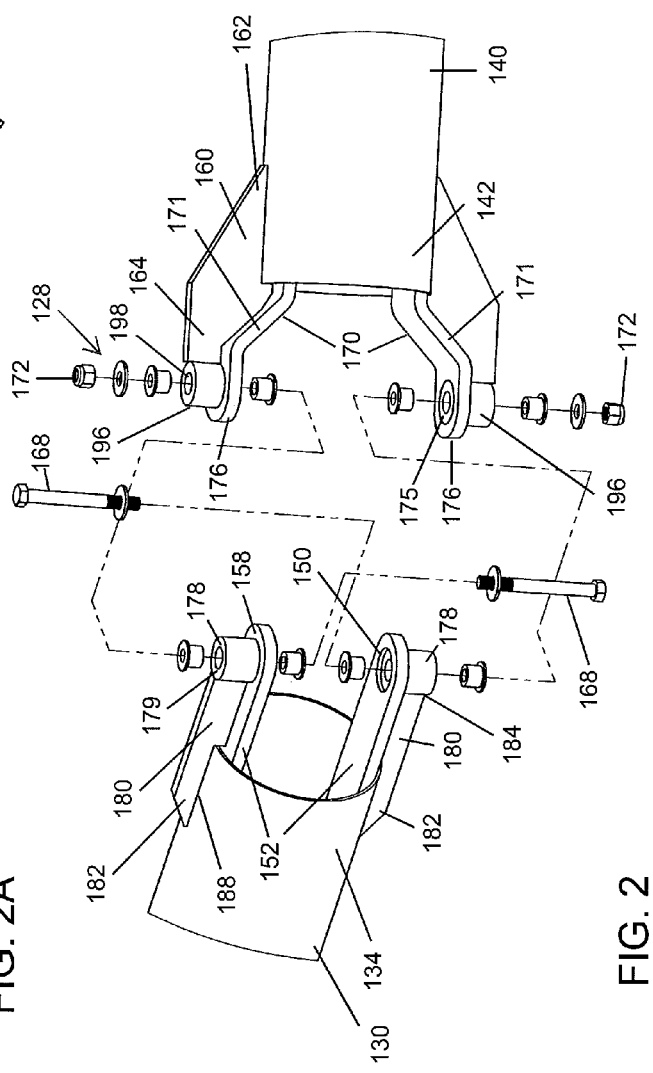

US 8,210,770 B2

BOOM ASSEMBLY FOR HOLDING HOSE OUTPUTTING LIQUEFIED PAVING MATERIAL

CROSS-REFERENCE TO RELATED APPLICATIONS

This application claims the benefit of priority to U.S. Provisional Application No. 61/081,828 filed on 18 Jul. 2008, which is herein incorporated by reference in its entirety.

BACKGROUND

The present invention relates to a boom assembly for holding a hose outputting liquefied paving material and, more particularly, to a boom assembly for carrying the weight of a hose outputting liquefied paving material such as asphalt without damaging the hose while allowing manual maneuverability of the hose.

One form of a typical apparatus for melting and applying paving material, such as liquefied asphalt, to cracks or slits in paved surfaces is mounted on a trailer for mobility and includes a standard hose for applying the material or a heated hose capable of heating the material to prevent the material within the hose from solidification during operation. Due to the considerable weight of the material and the hose per se, the hose is liable to drag on the ground during operation, resulting in damage to and faster fatigue of the hose. The problem is aggravated for expensive heated hoses that are less flexible, generally much more fragile, and much more cumbersome to work with than standard hoses. Replacement can not be immediately and easily accomplished on the job site even for standard hoses, not to mention the heated hoses. Furthermore, the work team remains idle before the hose is replaced. In an approach to avoid damage to the hose, an L-shaped boom is provided on the trailer and includes a vertical leg rotatably received in an upstanding pipe on the trailer and a horizontal leg having a distal end to which a carrier is attached in a location above a head of an operator. A section of a hose extending upward from the apparatus for melting and applying paving material can be supported by the carrier at a level avoiding damage to the hose. However, the L-shaped boom is bulky and, thus, requires a large space for operation and storage. Furthermore, the operator controlling the hose has to lift the hose above his or her head so as to extend the hose through the carrier before use, and maneuverability of the hose is often limited by the dangling length of the hose from the carrier. Further, the operator still has to look behind now and then to assure the relatively long hose neither drags on the ground nor has a pinch point.

U.S. Pat. No. 7,481,601 discloses a patcher system for patching a paved surface including a remotely controllable arm attachable to a support structure on a vehicle and a patching material dispensing subsystem disposed on the remotely controlled arm. The remotely controllable arm includes a plurality of actuators for pivoting not larger than 180°. When not in use, the remotely controllable arm is retracted behind the support structure. Although the patcher system of U.S. Pat. No. 7,481,601 has achieved market success, the remotely controllable arm, due to size, cost, and complicated construction and control, is not applicable to many apparatuses where a manually maneuverable hose is utilized.

Thus, a need exists for a boom assembly for carrying the weight of the hose outputting liquefied paving material without damaging the hose while allowing manual maneuverability of the hose.

SUMMARY

The present invention solves this need and other problems in the field of manually maneuverable liquefied paving material hoses by providing, in a preferred form, a hose holder boom assembly including a first tube having first and second open ends spaced along a first longitudinal axis. The first tube defines a first conduit between the first and second open ends thereof. A first pivotal connector pivotally mounts the first open end of the first tube to a first sidewall of a cabinet in the most preferred form of a melter body of a melter and applicator about a first pivot axis perpendicular to the first longitudinal axis. The second open end of the first tube has two sides opposite the first longitudinal axis and the first pivot axis. The cabinet is adapted to receive an end of a hose. The first pivotal connector defines a first passage adapted to receive the hose. Movement of the first tube relative to the first sidewall is limited to a pivot plane extending perpendicular to the first pivot axis and including the first longitudinal axis. A second tube includes first and second open ends spaced along a second longitudinal axis. The second tube defines a second conduit between the first and second open ends thereof. A second pivotal connector mounts the first open end of the second tube to the second open end of the first tube about a second pivot axis perpendicular to the pivot plane and parallel to and spaced from the first pivot axis. Relative movement between the first and second tubes is limited to the pivot plane with the second longitudinal axis located in the pivot plane. The first open end of the second tube is pivotable about the second pivot axis relative to the second open end of the first tube at an obtuse angle to each of the two sides of the second open end of the first tube. The second pivotal connector defines a second passage adapted to receive the hose. The hose extends through the first and second conduits defined by the first and second tubes and the first and second passages defined by the first and second pivotal connectors. The other end of the hose is adapted to output paving material from the cabinet.

In the most preferred form, the second pivotal device includes first and second tabs each having an inner end fixed to the second open end of the first tube and an outer end spaced from the first open end of the second tube and the second open end of the first tube. The inner ends of the first and second tabs are spaced in a direction parallel to the second pivot axis, and the outer ends of the first and second tabs are spaced along the second pivot axis. The second pivotal device further includes third and fourth tabs each having an inner end fixed to the first open end of the second tube and an outer end spaced from the first open end of the second tube and the second open end of the first tube. The inner ends of the third and fourth tabs are spaced in the direction parallel to the second pivot axis, and the outer ends of the third and the fourth tabs are spaced along the second pivot axis. The outer ends of the first and second tabs are located intermediate the outer ends of the third and fourth tabs along the second pivot axis. A first pin extends through the outer ends of the first and third tabs. Relative movement between the outer ends of the first and third tabs is limited to the pivot plane. A second pin extends through the outer ends of the second and fourth tabs. Relative movement between the outer ends of the second and fourth tabs is limited to the pivot plane. Furthermore, the first and second pins are spaced along the second pivot axis.

In a preferred form, a third tube has an open end pivotally connected by a third pivotal device to the open second end of the second tube about a third pivot axis parallel to and spaced from the first and second pivot axes. Relative movement between the second and third tubes is limited to the pivot plane with the third longitudinal axis located in the pivot plane. The hose extends through a third conduit defined by the third tube and a third passage defined by the third pivotal device. The melter body further includes a second sidewall perpendicular to the first sidewall. The first tube is parallel to the first sidewall and the second and third tubes are parallel to the second sidewall and perpendicular to the first sidewall when the hose is in a storage position on the melter body. Thus, the hose holder boom assembly can support the hose outputting liquefied paving material at a level above the ground to avoid damage to the hose and to ease the burden of the operator controlling the hose while allowing manual maneuverability of the hose.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 2 shows an enlarged, exploded, perspective view of a circled portion of FIG. 1.

FIG. 2A shows a cross-sectional view of the circled portion of FIG. 1.

Figure 1:
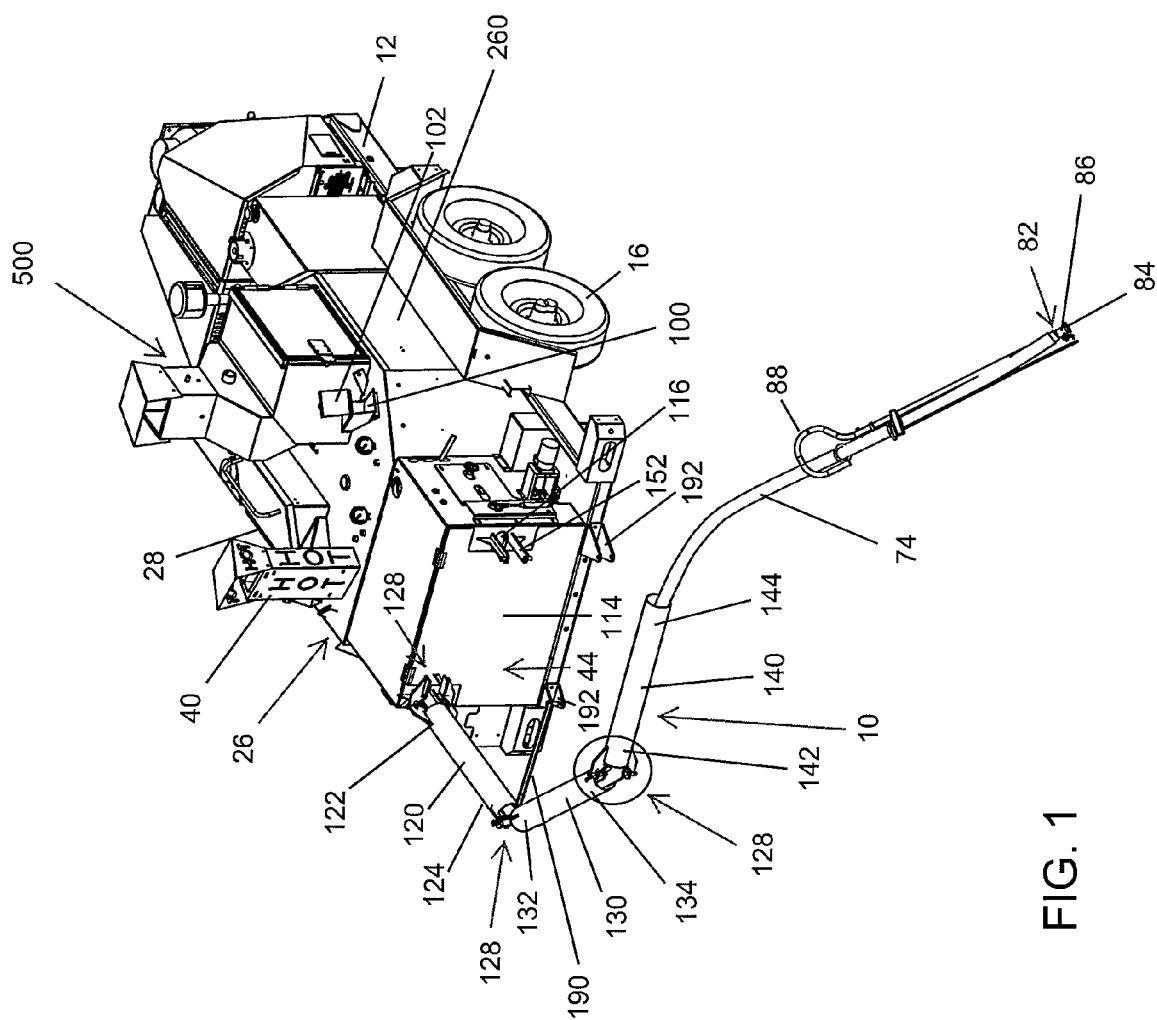
FIG. 1 shows a perspective view of a melter and applicator for applying filling material to paved surfaces utilizing a hose holder boom assembly according to the preferred teachings of the present invention.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "third", "fourth", "fifth", "sixth", "seventh", "eighth", "lower", "upper", "end", "side", "portion", "section", "horizontal", "vertical", "longitudinal", "radial", "outward", "spacing", "length", "height", "thickness", and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

A hose holder boom assembly according to the preferred teachings of the present invention is shown in the drawings and generally designated 10. Hose holder boom assembly 10 can be utilized with a melter and applicator 500 for applying paving material such as liquefied asphalt to paved surfaces. According to the preferred form shown, melter and applicator 500 is transported on a frame 12 that is towable behind a vehicle. Frame 12 includes a standard trailer hitch along with wheels 16, thus forming a trailer. Melter and applicator 500 includes a melter body in the most preferred form shown including a bin 26 for receiving paving material and having an access cover 28 that can be opened to place solidified paving material, such as asphalt bricks, into bin 26. Melter and applicator 500 further includes a heating system having one or more burners which are supplied with a fuel to heat bin 26 and its contents and to maintain the material in a liquefied state. The heating system includes a chimney 40 for venting the byproducts of combustion of the burner. The melter body of melter and applicator 500 further includes a cabinet 44 receiving an end of a hose 74 and a pump for pumping liquefied material from bin 26 to hose 74. Hose 74 can be of a standard type or of a heated type including an electric element for heating hose 74 to prevent material in hose 74 from solidification during operation. The end of hose 74 can be provided with a connector for releasable, rotatable connection to the pump. According to the preferred form shown, hose 74 includes a wand 82 on the other end thereof. Wand 82 terminates at a replaceable nozzle 84 and includes an adjustable valve 86 allowing the operator to control the flow of the liquefied paving material. A handle 88 is connected to hose 74 and lets the operator control wand 82 without having to directly contact hose 74 itself. Melter and applicator 500 further includes a wand access port 100 in communication with bin 26. Wand 82 of hose 74 can be inserted into wand access port 100 to prevent the paving material in hose 74 from solidification and to allow the paving material to be pumped back into bin 26, if desired. A cover 102 is provided to prevent heat loss when wand access port 100 is not being used. Melter and applicator 500 as described is conventional and can be of other forms including but not limited to of a commercially available type.

According to the preferred form shown, cabinet 44 includes a sidewall 114 facing rearward and having a hole 118 in a left, upper corner thereof, with hose 74 extending out of cabinet 44 via hole 118. Hole 118 extends along a horizontal axis parallel to a moving direction of melter and applicator 500 (i.e., the moving direction of the trailer) so that hose 74 extends out of cabinet 44 in a horizontal plane parallel to the moving direction of melter and applicator 500. Another hole 116 is defined in a right end of sidewall 114 and spaced from hole 118 in a horizontal direction parallel to the horizontal plane as well as in a vertical direction perpendicular to the horizontal plane. Hole 116 is used when a second hose is utilized for application of more paving material. Hole 116 extends along a horizontal axis parallel to the moving direction of melter and applicator 500 so that the second hose extends out of cabinet 44 in a horizontal plane parallel to the moving direction of melter and applicator 500. Furthermore, a brace 190 has a first end pivotably coupled to a first bracket 192 fixed to frame 12 at a location below hole 118 and spaced from hole 118 in the vertical direction. Brace 190 further has a second end 194. Another bracket 192 is fixed to frame 12 at a location below hole 116 and spaced from hole 116 in the vertical direction.

According to the preferred form shown, hose holder boom assembly 10 according to the preferred teachings of the present invention includes first, second, and third tubes 120, 130, and 140 pivotably coupled together. First tube 120 includes a first open end 122 pivotably coupled to sidewall 114 of cabinet 44 by a pivotal device or connector 128 and a second open end 124 pivotably coupled to a first open end 132 of second tube 130 by a pivotal device or connector 128. Second end 194 of brace 190 is fixed to second open end 124 of first tube 120 to support first tube 120 in a horizontal plane. A second open end 134 of second tube 130 is pivotably coupled to an open end 142 of third tube 140 by a pivotal device or connector 128. The other open end 144 of third tube 140 is free of pivotal coupling in the form shown. Each of first, second, and third tubes 120, 130, and 140 defines a conduit 212 between first and second open ends 122 and 124, 132 and 134, 142 and 144 thereof spaced along a longitudinal axis thereof.

According to the preferred form shown, each pivotal connector 128 includes upper and lower tabs 152 extending outward from second open end 134 of second tube 130 (or from second open end 124 of first tube 120, from hole 116 of sidewall 114 of cabinet 44, or from hole 118 of sidewall 114 of cabinet 44) in a direction parallel to the longitudinal axis of second tube 130 coplanar with the longitudinal axes of first and third tubes 120 and 140. Upper and lower tabs 152 are spaced in the vertical direction perpendicular to the moving direction of trailer and to an extending direction of hose 74 and have a first spacing therebetween larger than an outer diameter of hose 74. According to the most preferred form shown, each of upper and lower tabs 152 includes an inner end 154 welded to an inner periphery of second open end 134 of second tube 130 (or to an inner periphery of second open end 124 of first tube 120, to an inner periphery of hole 116 of sidewall 114 of cabinet 44, or to an inner periphery of hole 118 of sidewall 114 of cabinet 44). Each of upper and lower tabs 152 further includes an outer end 158 having an opening 150 and spaced from open end 142 of third tube 140 and second open end 134 of third tube 130 (or spaced from first open end 132 of second tube 130 and second open end 124 of first tube 120, or spaced from first open end 122 of first tube 120 and sidewall 114 of cabinet 44). An upper bushing 178 extends through opening 150 of upper tab 152 and has a central bore 179. A lower bushing 178 extends through opening 150 of lower tab 152 and has a central bore 179 aligned with central bore 179 of upper bushing 178. According to the most preferred form shown, each of upper and lower bushings 178 has annular cross sections and an outer diameter pressed into opening 150 or otherwise secured into opening 150 such as by welding so that upper and lower bushings 178 face away from each other. An upper gusset 180 includes a first end 182 having a stepped portion 188 with first and second faces 202 and 204 received on and welded to second open end 134 of second tube 130 (or received on and welded to second open end 124 of first tube 120, or directly welded to sidewall 114 of cabinet 44 with first end 182 of upper gusset 180 having no stepped portion 188). In the case that upper gusset 180 includes stepped portion 188, first face 202 of upper gusset 180 is fixed to the outer periphery of second open end 134 of second tube 130 (or to the outer periphery of second open end 124 of first tube 120), and second face 204 of upper gusset 180 is perpendicular to first face 202 of upper gusset 180 and abuts an end face of second open end 134 of second tube 130 (or abutting an end face of second open end 124 of first tube 120). Upper gusset 180 further includes a second end 184 abutting against upper bushing 178. According to the most preferred form shown, second end 184 of upper gusset 180 has an end face welded to upper bushing 178. An inner surface of upper gusset 180 that is outside of second open end 134 of second tube 130 (or outside of second open end 124 of first tube 120, or outside of sidewall 114 of cabinet 44) is welded to a section of upper tab 152 outside of second open end 134 of second tube 130 (or outside of second open end 124 of first tube 120, or outside of sidewall 114 of cabinet 44). Upper gusset 180 has a thickness less than the outer diameter of upper bushing 178. Furthermore, upper bushing 178 has a length equal to the sum of a thickness of upper tab 152 and a height of upper gusset 180. A lower gusset 180 includes a first end 182 having a stepped portion 188 with first and second faces 202 and 204 received on and welded to second open end 134 of second tube 130 (or received on and welded to second open end 124 of first tube 120, or directly welded to sidewall 114 of cabinet 44 with first end 182 of lower gusset 180 having no stepped portion 188). In the case that lower gusset 180 includes stepped portion 188, first face 202 of lower gusset 180 is fixed to the outer periphery of second open end 134 of second tube 130 (or to the outer periphery of second open end 124 of first tube 120), and second face 204 of lower gusset 180 is perpendicular to first face 202 of lower gusset 180 and abuts an end face of second open end 134 of second tube 130 (or abuts second open end 124 of first tube 120). Lower gusset 180 further includes a second end 184 abutting against lower bushing 178. According to the most preferred form shown, second end 184 of lower gusset 180 has an end face welded to lower bushing 178. An inner surface of lower gusset 180 that is outside of second open end 134 of second tube 130 (or outside of second open end 124 of first tube 120, or outside of sidewall 114 of cabinet 44) is welded to a section of lower tab 152 outside of second open end 134 of second tube 130 (or outside of second open end 124 of first tube 120, or outside of sidewall 114 of cabinet 44). Lower gusset 180 has a thickness less than the outer diameter of lower bushing 178. Furthermore, lower bushing 178 has a length equal to the sum of a thickness of lower tab 152 and a height of lower gusset 180. Upper and lower tabs 152 are intermediate upper and lower gussets 180 in the vertical direction.

According to the preferred teachings of the present invention, each pivotal connector 128 further includes upper and lower tabs 170 in the most preferred form shown as upper and lower plate tabs extending outward from open end 142 of third tube 140 (or from first open end 132 of second tube 130, or from first open end 122 of first tube 120) in a direction parallel to the longitudinal axis of third tube 140 (or to the longitudinal axis of second tube 130, or to the longitudinal axis of first tube 120). Upper and lower tabs 170 include outer ends 176 spaced in the vertical direction larger than a spacing between upper and lower bushings 178. According to the most preferred form shown, each of upper and lower tabs 170 includes an inner end 174 welded to an inner periphery of open end 142 of third tube 140 (or to an inner periphery of first open end 132 of second tube 130, or to an inner periphery of first open end 122 of first tube 120) and the outer end 176 outside open end 142 of third tube 140 (or outside first open end 132 of second tube 130, or outside first open end 122 of first tube 120). Outer end 176 of each of upper and lower tabs 170 has an opening 175 and is spaced from open end 142 of third tube 140 and second open end 134 of third tube 130 (or spaced from first open end 132 of second tube 130 and second open end 124 of first tube 120, or spaced from first open end 122 of first tube 120 and sidewall 114 of cabinet 44). Each of upper and lower tabs 170 further includes a slanted section 171 extending outward away from third tube 140 along the longitudinal axis of third tube 140 and in a radial direction perpendicular to the longitudinal axis of third tube 140 (or away from second tube 130 along the longitudinal axis of second tube 130 and in the radial direction, or away from first tube 120 along the longitudinal axis of first tube 120 and in the radial direction) and interconnected between outer and inner ends 176 and 174. An upper bushing 196 in the preferred form shown as a plate bushing extends through opening 175 of upper tab 170 and has a central bore 198. A lower bushing 196 in the most preferred form shown as a plate bushing extends through opening 175 of lower tab 170 and has a central bore 198 aligned with central bore 198 of upper bushing 196. According to the most preferred form shown, each of upper and lower bushings 196 has annular cross sections and an outer diameter pressed into opening 175 or otherwise secured into opening 175 such as by welding so that upper and lower bushings 196 face away from each other. An upper plate 160 includes a first end 162 having a stepped portion received on and welded to open end 142 of third tube 140 (or received on and welded to first open end 132 of second tube 130, or received on and welded to first open end 122 of first tube 120). The stepped portion of first end 162 of upper plate 160 includes a first face 206 fixed to the outer periphery of open end 142 of third tube 140 (or to the outer periphery of first open end 132 of second tube 130, or to the outer periphery of first open end 122 of first tube 120) and a second face 208 perpendicular to first face 206 of upper plate 160 and abutting an end face of open end 142 of third tube 140 (or abutting an end face of first open end 132 of second tube 130, or abutting an end face of first open end 122 of first tube 120). Upper plate 160 further includes a second end 164 abutting against upper bushing 196. According to the most preferred form shown, second end 164 of upper plate 160 has an end face welded to upper bushing 196. An inner surface of upper plate 160 that is outside of open end 142 of third tube 140 (or outside of first open end 132 of second tube 130, or outside of first open end 122 of first tube 120) is welded to slanted section 171 and to a section of inner end 174 of upper tab 170 outside of open end 142 of third tube 140 (or outside of first open end 132 of second tube 130, or outside of first open end 122 of first tube 120). A lower plate 160 includes a first end 162 having a stepped portion received on and welded to open end 142 of third tube 140 (or received on and welded to first open end 132 of second tube 130, or received on and welded to first open end 122 of first tube 120). The stepped portion of first end 162 of lower plate 160 includes a first face 206 fixed to the outer periphery of open end 142 of third tube 140 (or to the outer periphery of first open end 132 of second tube 130, or to the outer periphery of first open end 122 of first tube 120) and a second face 208 perpendicular to first face 206 of lower plate 160 and abutting an end face of open end 142 of third tube 140 (or abutting an end face of first open end 132 of second tube 130, or abutting an end face of first open end 122 of first tube 120). Lower plate 160 further includes a second end 164 abutting against lower bushing 196. According to the most preferred form shown, second end 164 of lower plate 160 has an end face welded to lower bushing 196. An inner surface of lower plate 160 that is outside of open end 142 of third tube 140 (or outside of first open end 132 of second tube 130, or outside of first open end 122 of first tube 120) is welded to slanted section 171 and to a section of inner end 174 of lower tab 170 outside of open end 142 of third tube 140 (or outside of first open end 132 of second tube 130, or outside of first open end 122 of first tube 120). Upper and lower tabs 170 are intermediate upper and lower plates 160 in the vertical direction.

According to the preferred embodiment shown, upper and lower bushings 178 are received between upper and lower bushings 196 with central bores 179 of upper and lower bushings 178 aligned with central bores 198 of upper and lower bushings 196. An upper pin 168 is extended through central bore 198 of upper bushing 196 and central bore 179 of upper bushing 178 and has a threaded section coupled with a nut 172. Similarly, a lower pin 168 is extended through central bore 198 of lower bushing 196 and central bore 179 of lower bushing 178 and has a threaded section coupled with a nut 172. Upper and lower pins 168 define a vertical pivot axis for relative pivotal movement between second open end 134 of second tube 130 and open end 142 of third tube 140 (or between second open end 124 of first tube 120 and first open end 132 of second tube 130, or between first open end 122 of first tube 120 and sidewall 114 of cabinet 44). Note that outer ends 176 of upper and lower tabs 170 are spaced along the vertical pivot axis. Furthermore, outer ends 158 of upper and lower tabs 152 are spaced along the vertical pivot axis and intermediate outer ends 176 of upper and lower tabs 170 along the vertical pivot axis. Further, upper and lower bushings 178 are intermediate upper and lower bushings 196 along the vertical pivot axis. Upper and lower pins 168 are also spaced along the vertical pivot axis. Relative movement between outer end 158 of upper tab 152 relative to outer end 176 of upper tab 170 of each pivot connector 128 is limited to a horizontal pivot plane. Likewise, relative movement between outer end 158 of lower tab 152 relative to outer end 176 of lower tab 170 of each pivotal connector 128 is limited to the horizontal pivot plane.

It can be appreciated that a passage 210 is defined in each pivotal connector 128. Specifically, a passage 210 is defined between inner ends 154 and 174 of upper and lower tabs 152 and 170 and between upper and lower pins 168 of each pivotal connector 128. Thus, hose 74 can extend through passages 210 defined by pivotal connectors 128 and conduits 212 defined by first, second, and third tubes 120, 130, and 140.

In manufacture and assembly of upper tab 152 and upper gusset 180 with stepped portion 188, upper bushing 178 is fixed in opening 150 of upper tab 152, and second end 184 of upper gusset 180 is fixed to upper bushing 178. A side of upper gusset 180 abuts or is fixed a face of upper tab 152, leaving a gap between stepped portion 188 and inner end 154 of upper tab 152. Upper gusset 180/upper tab 152 can be slid to its position where second face 204 of upper gusset 180 abuts the end face of second open end 134 of second tube 130 (or abuts the end face of second open end 124 of first tube 120). Next, first face 202 of upper gusset 180 can be fixed such as by welding to the outer periphery of second open end 134 of second tube 130 (or to the outer periphery of second open end 124 of first tube 120). Likewise, in manufacture and assembly of lower tab 152 and lower gusset 180 with stepped portion 188, lower bushing 178 is fixed in opening 150 of lower tab 152, and second end 184 of lower gusset 180 is fixed to lower bushing 178. A side of lower gusset 180 abuts or is fixed to a face of lower tab 152, leaving a gap between stepped portion 188 and inner end 154 of lower tab 152. Lower gusset 180/lower tab 152 can be slid to its position where second face 204 of lower gusset 180 abuts the end face of second open end 134 of second tube 130 (or abuts the end face of second open end 124 of first tube 120). Next, first face 202 of lower gusset 180 can be fixed such as by welding to the outer periphery of second open end 134 of second tube 130 (or to the outer periphery of second open end 124 of first tube 120).

In manufacture and assembly of upper tab 170 and upper plate 160, upper bushing 196 is fixed in opening 175 of upper tab 170, and second end 164 of upper plate 160 is fixed to upper bushing 196. The inner side of upper plate 160 is fixed to slanted section 171 and a portion of inner end 174 of upper tab 170, leaving a gap between the stepped portion of upper plate 160 and inner end 174 of upper tab 170. Upper plate 160/upper tab 170 can be slid to its position where second face 208 of upper plate 160 abuts the end face of open end 142 of third tube 140 (or abuts the end face of first open end 132 of second tube 130, or abuts the end face of first open end 122 of first tube 120) with central bore 198 of upper bushing 196 aligned with central bore 179 of upper bushing 178. Next, first face 206 of upper plate 160 can be welded to the outer periphery of open end 142 of third tube 140 (or to the outer periphery of first open end 132 of second tube 130, or to the outer periphery of first open end 122 of first tube 120). Likewise, in manufacture and assembly of lower tab 170 and lower plate 160, lower bushing 196 is fixed in opening 175 of lower tab 170, and second end 164 of lower plate 160 is fixed to lower bushing 196. The inner side of lower plate 160 is fixed to slanted section 171 and a portion of inner end 174 of lower tab 170, leaving a gap between the stepped portion of lower plate 160 and inner end 174 of lower tab 170. Lower plate 160/lower tab 170 can be slid to its position where second face 208 of lower plate 160 abuts the end face of open end 142 of third tube 140 (or abuts the end face of first open end 132 of second tube 130, or abuts the end face of first open end 122 of first tube 120) with central bore 198 of lower bushing 196 aligned with central bore 179 of lower bushing 178. Next, first face 206 of lower plate 160 can be welded to the outer periphery of open end 142 of third tube 140 (or to the outer periphery of first open end 132 of second tube 130, or to the outer periphery of first open end 122 of first tube 120). Upper and lower pins 168 are then extended through central bores 198 and 179 of upper and lower bushings 196 and 178 and engaged with nuts 172 to complete assembly of pivotal connector 128.

It can be appreciated that first, second, and third tubes 120, 130, and 140 can be simply cut to length with a square cut perpendicular to the respective longitudinal axes to provide the end faces. Assembly of pivotal connector 128 is easy by forming gusset 180/tab 152 and plate 160/tab 170. Pivotal connectors 128 thus made are inexpensive.

It can be appreciated that upper and lower gussets 180 and upper and lower tabs 152 can be mounted to open end 142 of third tube 140 (or to first open end 132 of second tube 130, or to first open end 122 of first tube 120). In this case, upper and lower tabs 170 and upper and lower plates 160 are mounted on second open end 134 of second tube 130 (or to second open end 124 of first tube 120, or to sidewall 114 of cabinet 44). It can be further appreciated that upper and lower gussets 180, upper and lower tabs 152, upper and lower tabs 170, and upper and lower plates 160 in other forms accomplishing the functions required would be within the skill of the art.

The longitudinal axes of first, second, and third tubes 120, 130, and 140 are coplanar with one another so that first, second, and third tubes 120, 130, and 140 extend in a common horizontal pivot plane that is parallel to the moving direction of the trailer and parallel to and above the ground. Furthermore, first, second, and third tubes 120, 130, and 140 are pivotal about parallel, spaced vertical pivot axes formed by pins 168 of respective pivotal connectors 128 so that first, second, and third tubes 120, 130, and 140 are maintained in the horizontal pivot plane. Hose 74 extends horizontally out of sidewall 114 of cabinet 44 and is directly supported and protected by first, second, and third tubes 120, 130, and 140 at a rear portion thereof. Further, the rear portion of hose 74 will not extend beyond passages 210 defined by pivotal connectors 128 and conduits 212 defined by first, second, and third tubes 120, 130, and 140. Thus, the rear portion of hose 74 is protected and supported in the horizontal pivot plane at a level above the ground by first, second, and third tubes 120, 130, and 140. Furthermore, the rear portion of hose 74 can only move together with first, second, and third tubes 120, 130, and 140 in the horizontal pivot plane perpendicular to the vertical pivot axes and parallel to the ground such that movement of front portion of hose 74 due to gravity is not a factor. However, handle 88 located on a front portion of hose 74 is spaced from third tube 140 to allow smooth operation of handle 88. It can be appreciated that pivotal movement of first, second, and third tubes 120, 130, and 140 and the rear portion of hose 74 therein will not damage the rear portion of hose 74.

It can be appreciated that second open end 124 of first tube 120 has two sides opposite the longitudinal axis of first tube 120 and a first one of the pivot axes of pivotal connector 128 that mounts first open end 122 of first tube 120 to sidewall 114, and first open end 132 of second tube 130 is pivotable about a second one of the pivot axes, of pivotal connector 128 mounting first open end 132 of second tube 130 to second open end 124 of first tube 120, relative to second open end 124 of first tube 120 at an obtuse angle to each side of second open end 124 of first tube 120. Likewise, second open end 134 of second tube 130 has two sides opposite the longitudinal axis of second tube 130 and the second pivot axis, and open end 142 of third tube 140 is pivotable about a third one of the pivot axes, of pivotal connector 128 mounting open end 142 of third tube 140 to second open end 134 of second tube 130, relative to second open end 134 of second tube 130 at an obtuse angle to each side of second open end 134 of second tube 130. Thus, according to the most preferred form shown, each pivotal connector 128 can pivot more than 180° which precludes the use of hydraulic actuators.

In a case that a second hose is utilized, a second hose holder boom assembly according to the preferred teachings of the present invention can be utilized. In the preferred form shown, melter and applicator 500 includes upper and lower tabs 152 for the second hose holder boom assembly extending from hole 116 of sidewall 114 such that melter and applicator 500 can be equipped at the manufacturer with either one or two hose holder boom assemblies 10 as desired. It can be appreciated that the second hose holder boom assembly includes a brace having a first end pivotably connected to bracket 192 below hole 116 and a second end fixed to the first tube of the second hose holder boom assembly for supporting purposes. The second hose is supported by the second hose holder boom assembly in a horizontal plane vertically below hose 74, and the whole second hose holder boom assembly is parallel to and spaced from hose holder boom assembly 10.

Figure 3:
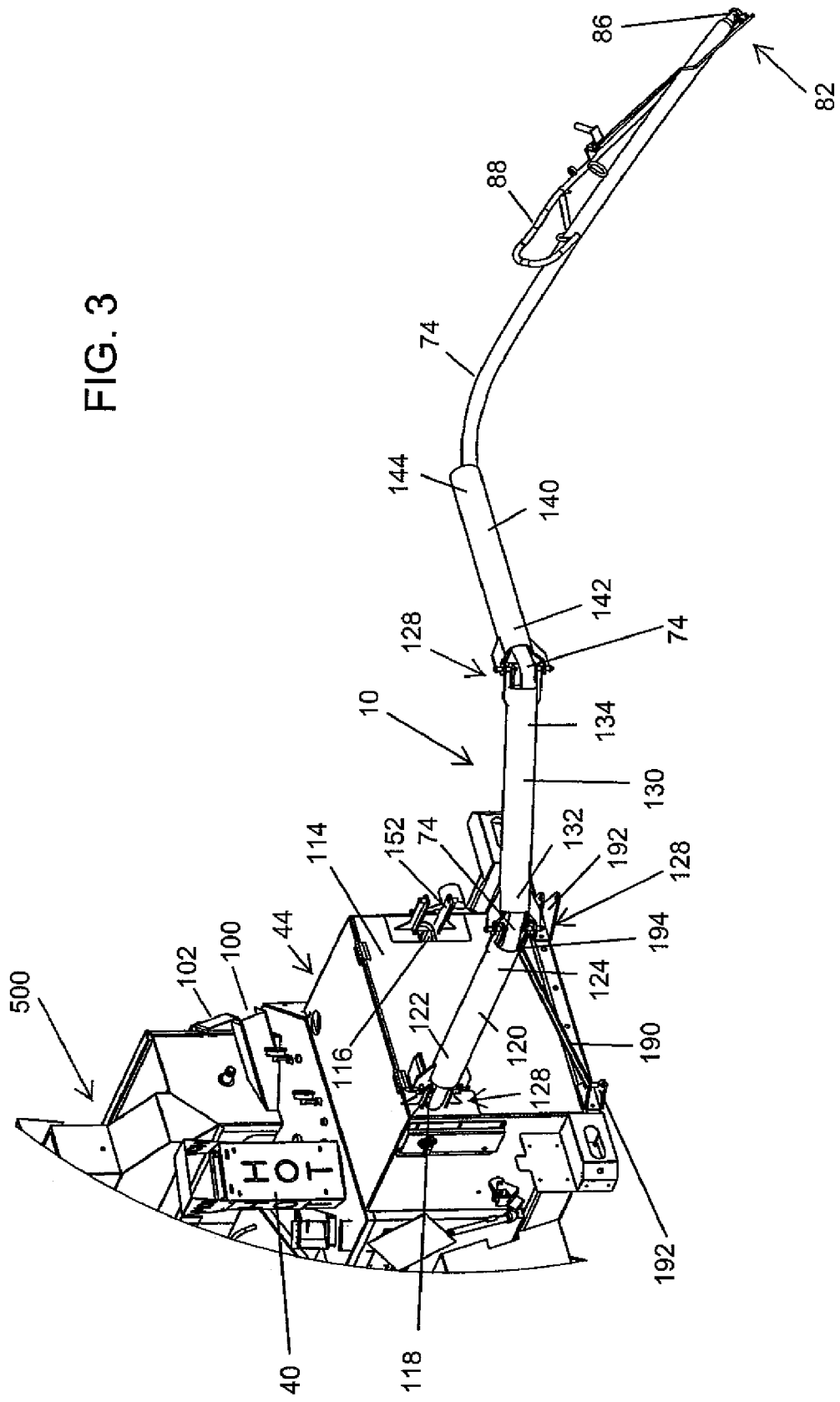
FIG. 3 shows a partial, left, perspective view of the melter and applicator of FIG. 1.
Figure 4:
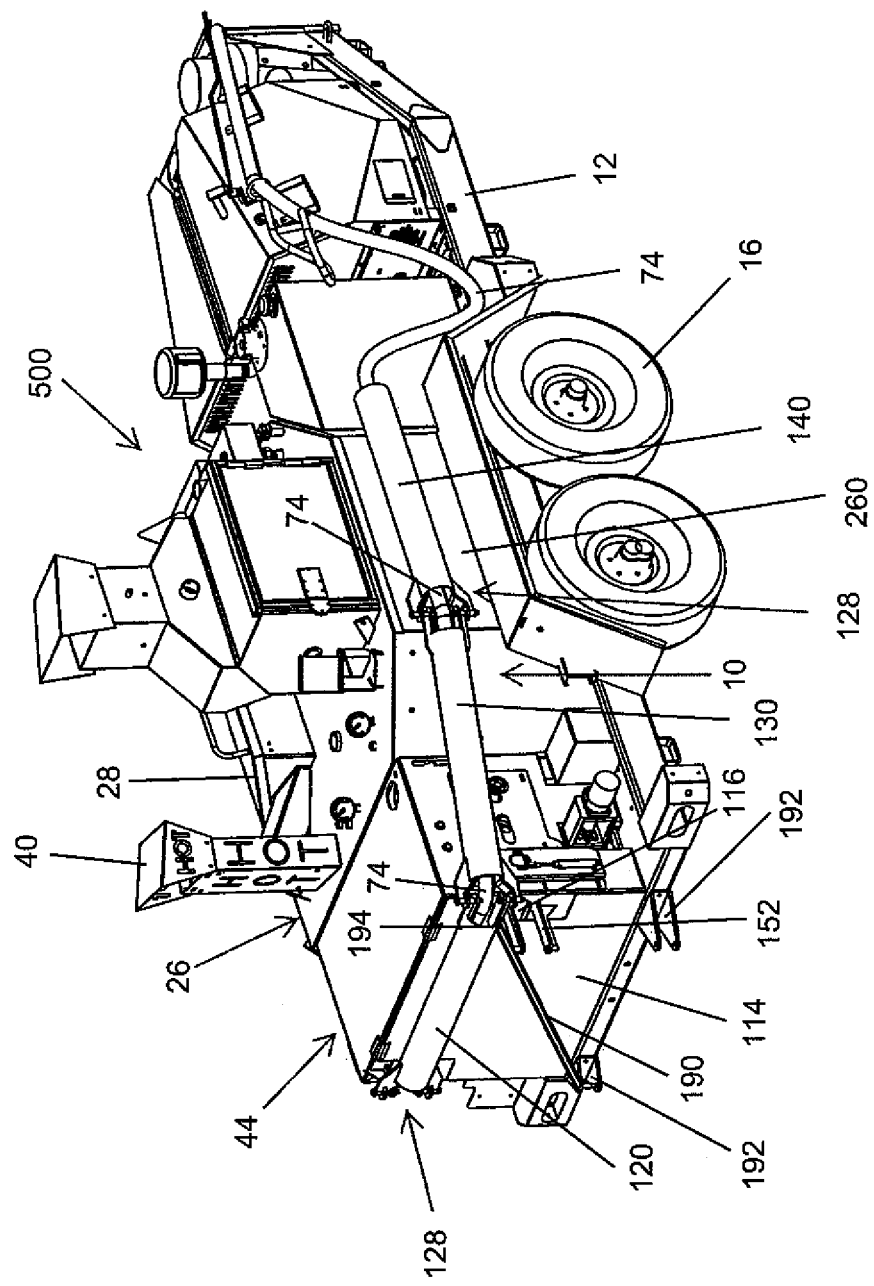
FIG. 4 shows a perspective view of the melter and applicator of FIG. 1 with the hose holder boom assembly in a storage position.

Now that the basic construction of hose holder boom assembly 10 according to the preferred teachings of the present invention has been set forth, operation can be explained, and some of the advantages obtained thereby highlighted. In particular, for the sake of explanation, it will be assumed that only one hose holder boom assembly 10 is utilized and in an operative state shown in FIGS. 1 and 3. Note that first, second, and third tubes 120, 130, and 140 support the rear portion of hose 74 in the horizontal pivot plane at a level above the ground. An operator can easily control handle 88 to proceed with application of the paving material through nozzle 84 under eased burden. Furthermore, the operator can easily and manually move the rear portion of hose 74 sideways. Pivotal connectors 128 allow hose 74 to move smoothly together with first, second, and third tubes 120, 130, and 140 that can pivot about the vertical pivot axes defined by pins 168, providing enhanced manual maneuverability of hose 74. Furthermore, hose 74 will not drag on the ground, and there will be no pinch point. Thus, the operator does not have to look behind to check the condition of hose 74 during operation. Thus, when not in use, wand 82 of hose 74 can be placed in wand access port 100 to prevent the paving material in hose 74 from solidification and/or to allow the paving material to be pumped back into bin 26. After operation, hose holder boom assembly 10 according to the preferred teachings of the present invention can be moved to a storage position shown in FIG. 4. Specifically, second open end 124 of first tube 120 is supported by brace 190 at a level higher than upper tab 152 for the second hose holder boom assembly. When hose 74 is in the storage position, tube 120 is parallel to sidewall 114, and second and third tubes 130 and 140 are substantially parallel to a sidewall 260 of bin 26 perpendicular to sidewall 114.

Note that brace 190 is adjacent sidewall 114 of cabinet 44 and located below and substantially coplanar with first tube 120 in the storage position so that the storage space required for hose holder boom assembly 10 according to the preferred teachings of the present invention is not increased. Bin 26 can include brackets to support second and/or third tubes 130 and 140. Further, the trailer can include suitable arrangements to retain the front portion of hose 74 to a side of the trailer so that hose holder boom assembly 10 according to the preferred teachings of the present invention can be reliably positioned while the trailer is being towed.

Hose holder boom assembly 10 according to the preferred teachings of the present invention can include fewer or more than three tubes interconnected by pivotal connectors 128 so that the overall length of hose holder boom assembly 10 can be decreased or increased in response to the overall length of hose 74 in use. Note that all of the tubes 120, 130 and 140 of hose holder boom assembly 10 according to the preferred teachings of the present invention can be easily assembled or detached on the job site according to needs. Furthermore, all of the tubes 120, 130 and 140 of hose holder boom assembly 10 according to the preferred teachings of the present invention can be identical to each other to provide interchangeability which allows faster assembly of hose holder boom assembly 10. It can be appreciated that hose 74 extends horizontally out of sidewall 114 of cabinet 44 and is directly supported and protected by first, second, and third tubes 120, 130 and 140 at the rear portion thereof so that troublesome operation of lifting hose 74 above the head of the operator before use in the conventional L-shaped boom is not required. Furthermore, the space required for operation and storage of hose 74 and hose holder boom assembly 10 according to the preferred teachings of the present invention is relatively small in comparison with the conventional L-shaped boom, for the rear portion of hose 74 is received in and supported by first, second, and third tubes 120, 130 and 140 that can be pivoted to and retained in their storage positions not extending in the vertical direction beyond melter and applicator 500. Thus, hose holder boom assembly 10 according to the preferred teachings of the present invention provides a compact, simple, length-adjustable structure to reliably hold and protect hose 74 in the horizontal pivot plane while allowing manual maneuverability of hose 74 during use.

In a case that a second hose and a second hose holder boom assembly according to the preferred teachings of the present invention are utilized, the two hose holder boom assemblies will not interfere with each other in operation and storage. This is because the second hose is supported by the second hose holder boom assembly in a horizontal plane parallel to and below hose 74 and because the whole second hose holder boom assembly is parallel to and spaced from hose holder boom assembly 10. The space required for storage is not increased even though the second hose holder boom assembly is utilized, for sidewall 114 of cabinet 44 provides a common base for both hose holder boom assemblies 10. Specifically, when the second hose holder boom assembly is in its storage position, the first tube of the second hose holder boom assembly is below and coplanar with first tube 120 of hose holder boom assembly 10, and the second and third tubes of the second hose holder boom assembly as well as the front portion of the second hose can be retained to the other side of the trailer by suitable arrangements similar to those for the first hose holder boom assembly 10 shown. It can be appreciated that the tubes 120, 130, and 140 of the two hose holder boom assemblies 10 according to the preferred teachings of the present invention can be interchanged. Furthermore, in a case that one of holes 116 and 118 is blocked and/or one of the two hose holder boom assemblies 10 is damaged or malfunctions, application of paving material can continue through use of the unblocked hole 116, 118 and the undamaged/normal hose holder boom assembly to save time and costs.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A melter and applicator comprising, in combination:
    a melter body including a first sidewall having a first hole, with the melter body adapted to receive liquefied paving material;
    a hose extending out of the melter body via the first hole for outputting the liquefied paving material;
    a first tube including first and second open ends spaced along a first longitudinal axis, with the first tube defining a first conduit between the first and second open ends thereof;
    a first pivotal connector pivotally mounting the first open end of the first tube to the first sidewall about a first pivot axis perpendicular to the first longitudinal axis, with the second open end of the first tube having two sides opposite the first longitudinal axis and the first pivot axis, with the first pivotal connector defining a first passage receiving the hose, with movement of the first tube relative to the first sidewall being limited to a pivot plane extending perpendicular to the first pivot axis and including the first longitudinal axis;
    a second tube including first and second open ends spaced along a second longitudinal axis, with the second tube defining a second conduit between the first and second open ends thereof; and
    a second pivotal connector mounting the first open end of the second tube to the second open end of the first tube about a second pivot axis perpendicular to the pivot plane and parallel to and spaced from the first pivot axis, with relative movement between the first and second tubes being limited to the pivot plane with the second longitudinal axis located in the pivot plane, with the first open end of the second tube pivotable about the second pivot axis relative to the second open end of the first tube at a first obtuse angle to each of the two sides of the second open end of the first tube, with the second pivotal connector defining a second passage receiving the hose, with the hose extending through the first and second conduits defined by first and second tubes and the first and second passages defined by the first and second pivotal connectors.

2. The melter and applicator as claimed in claim 1, with the second pivotal connector including:
    first and second tabs each including an inner end fixed to the second open end of the first tube and an outer end spaced from the first open end of the second tube and the second open end of the first tube, with the inner ends of the first and second tabs spaced in a first direction parallel to the second pivot axis, with the outer ends of the first and second tabs spaced along the second pivot axis;
    third and fourth tabs each including an inner end fixed to the first open end of the second tube and an outer end spaced from the first open end of the second tube and the second open end of the first tube, with the inner ends of the third and fourth tabs spaced in the first direction parallel to the second pivot axis, with the outer ends of the third and the fourth tabs spaced along the second pivot axis, with the outer ends of the first and second tabs intermediate the outer ends of the third and fourth tabs along the second pivot axis;

a first pin extending through the outer ends of the first and third tabs, with relative movement between the outer ends of the first and third tabs being limited to the pivot plane; and a second pin extending through the outer ends of the second and fourth tabs, with relative movement between the outer ends of the second and fourth tabs being limited to the pivot plane, with the first and second pins spaced along the second pivot axis.

3. The melter and applicator as claimed in claim 2, with the first pivotal connector including:

fifth and sixth tabs each including an inner end fixed to an inner periphery of the first hole of the first sidewall and an outer end spaced from the first open end of the first tube and the first sidewall, with the inner ends of the fifth and sixth tabs spaced in a second direction parallel to the first pivot axis, with the outer ends of the fifth and sixth tabs spaced along the first pivot axis;

seventh and eighth tabs each including an inner end fixed to the first open end of the first tube and an outer end spaced from the first open end of the first tube and the first sidewall, with the inner ends of the seventh and eighth tabs spaced in the second direction parallel to the first pivot axis, with the outer ends of the seventh and eighth tabs spaced along the first pivot axis, with the outer ends of the fifth and sixth tabs intermediate the outer ends of the seventh and eighth tabs along the first pivot axis;

a third pin extending through the outer ends of the fifth and seventh tabs, with movement of the outer end of the seventh tab relative to the outer end of the fifth tab being limited to the pivot plane; and a fourth pin extending through the outer ends of the sixth and eighth tabs, with movement of the outer end of the eighth tab relative to the outer end of the sixth tab being limited to the pivot plane, with the third and fourth pins spaced along the first pivot axis.

4. The melter and applicator as claimed in claim 3, with the inner end of each of the seventh and eighth tabs fixed to an inner periphery of the first open end of the first tube, and with the first passage defined between the inner ends of the fifth, sixth, seventh and eighth tabs and between the third and fourth pins.

5. The melter and applicator as claimed in claim 4, with the outer end of the fifth tab including a first opening, with the outer end of the sixth tab including a second opening aligned with the first opening, with the outer end of the seventh tab including a third opening aligned with the first opening, with the outer end of the eighth tab including a fourth opening aligned with the second opening, with the first pivotal connector further including:

a first bushing received in the first opening and including a first central bore;

a second bushing received in the second opening and including a second central bore aligned with the first central bore;

a third bushing received in the third opening and including a third central bore aligned with the first central bore, with the third pin extending through the first and third central bores; and a fourth bushing received in the fourth opening and including a fourth central bore aligned with the second central bore, with the first and second bushings intermediate the third and fourth bushings along the first pivot axis, with the fourth pin extending through the second and fourth central bores.

6. The hose holder boom assembly as claimed in claim 5, with the first pivotal connector further including:

a first gusset including a first end fixed to the first sidewall and a second end fixed to the first bushing;

a second gusset including a first end fixed to the first sidewall and a second end fixed to the second bushing, with the fifth and sixth tabs intermediate the first and second gussets in the second direction parallel to the first pivot axis;

a first plate including a first end fixed to an outer periphery of the first open end of the first tube and a second end fixed to the third bushing; and a second plate including a first end fixed to the outer periphery of the first open end of the first tube and a second end fixed to the fourth bushing, with the seventh and eighth tabs intermediate the first and second plates in the second direction parallel to the first pivot axis.

7. The melter and applicator as claimed in claim 6, with the first end of each of the first and second plates including a first face fixed to the outer periphery of the first open end of the first tube and a second face perpendicular to the first face, with the second face abutting an end face of the first open end of the first tube perpendicular to the outer periphery of the first open end of the first tube, with the seventh tab including a first slanted section extending outward away from the first tube along the first longitudinal axis and in a radial direction perpendicular to the first longitudinal axis, with the first plate including a first inner surface outside of the first open end of the first tube and fixed to the first slanted section of the seventh tab, with the eighth tab including a second slanted section extending outward away from the first tube along the first longitudinal axis and in the radial direction, with the second plate including an inner surface outside of the first open end of the first tube and fixed to the second inclined section of the eighth tab.

8. The melter and applicator as claimed in claim 2, with the inner end of each of the first and second tabs fixed to an inner periphery of the second open end of the first tube, with the inner end of each of the third and fourth tabs fixed to an inner periphery of the first open end of the second tube, and with the second passage defined between the inner ends of the first, second, third and fourth tabs and between the first and second pins.

9. The melter and applicator as claimed in claim 8, with the outer end of the first tab including a first opening, with the outer end of the second tab including a second opening aligned with the first opening, with the outer end of the third tab including a third opening aligned with the first opening, with the outer end of the fourth tab including a fourth opening aligned with the second opening, with the second pivotal connector further including:

a first bushing received in the first opening and including a first central bore;

a second bushing received in the second opening and including a second central bore aligned with the first central bore;

a third bushing received in the third opening and including a third central bore aligned with the first central bore, with the first pin extending through the first and third central bores; and a fourth bushing received in the fourth opening and including a fourth central bore aligned with the second central bore, with the first and second bushings intermediate the third and fourth bushings along the second pivot axis, with the second pin extending through the second and fourth central bores.

10. The melter and applicator as claimed in claim 9, with the second pivotal connector further including:
   a first gusset including a first end fixed to the second open end of the first tube and a second end fixed to the first bushing;
   a second gusset including a first end fixed to the second open end of the first tube and a second end fixed to the second bushing, with the first and second tabs intermediate the first and second gussets in the first direction parallel to the second pivot axis;
   a first plate including a first end fixed to an outer periphery of the first open end of the second tube and a second end fixed to the third bushing; and
   a second plate including a first end fixed to the outer periphery of the first open end of the second tube and a second end fixed to the fourth bushing, with the third and fourth tabs intermediate the first and second plates in the first direction parallel to the second pivot axis.

11. The melter and applicator as claimed in claim 10, with the first end of each of the first and second plates including a first face fixed to the outer periphery of the first open end of the second tube and a second face perpendicular to the first face, with the second face abutting an end face of the first open end of the second tube perpendicular to the outer periphery of the first open end of the second tube, with the first end of each of the first and second gussets including a third face fixed to the outer periphery of the second open end of the first tube and a fourth face perpendicular to the third face, with the fourth face abutting an end face of the second open end of the first tube perpendicular to the outer periphery of the second open end of the first tube, with the third tab including a first slanted section extending outward away from the second tube along the first longitudinal axis and in a radial direction perpendicular to the second longitudinal axis, with the first plate including a first inner surface outside of the first open end of the second tube and fixed to the first slanted section of the third tab, with the fourth tab including a second slanted section extending outward away from the second tube along the first second axis and in the radial direction, with the second plate including a second inner surface outside of the first open end of the second tube and fixed to the second slanted section of the fourth tab.

12. The melter and applicator as claimed in claim 1, with the first sidewall further including a second hole spaced from the first hole in a first direction perpendicular to the pivot plane as well as in a second direction parallel to the pivot plane, with a second hose adapted to extend out of the melter body via the second hole for outputting the liquefied paving material.

13. The melter and applicator as claimed in claim 1, further comprising, in combination: a third tube including first and second open ends spaced along a third longitudinal axis, with the third tube defining a third conduit between the first and second open ends thereof; and a third pivotal connector mounting the first open end of the third tube to the second open end of the second tube about a third pivot axis perpendicular to the pivot plane and parallel to and spaced from the first and second pivot axes, with relative movement between the second and third tubes being limited to the pivot plane with the third longitudinal axis located in the pivot plane, with the second open end of the second tube having two sides opposite the third longitudinal axis and the third pivot axis, with the first open end of the third tube pivotable about the third pivot axis relative to the second open end of the second tube at a second obtuse angle to each of the two sides of the second open end of the second tube, with the third pivotal connector defining a third passage receiving the hose, with the hose extending through the third conduit defined by the third tube and the third passage defined by the third pivotal device.

14. The melter and applicator as claimed in claim 13, with the melter body further including a second sidewall perpendicular to the first sidewall, with the first tube parallel to the first sidewall and with the second and third tubes parallel to the second sidewall and perpendicular to the first sidewall when the hose is in a storage position on the melter body.

15. A hose holder boom assembly comprising, in combination:
   a first tube including first and second open ends spaced along a first longitudinal axis, with the first tube defining a first conduit between the first and second open ends thereof;
   a first pivotal connector pivotally mounting the first open end of the first tube to a sidewall of a cabinet about a first pivot axis perpendicular to the first longitudinal axis, with the second open end of the first tube having two sides opposite the first longitudinal axis and the first pivot axis, with the cabinet adapted to receive an end of a hose, with the first pivotal connector defining a first passage adapted to receive the hose, with movement of the first tube relative to the sidewall being limited to a pivot plane extending perpendicular to the first pivot axis and including the first longitudinal axis;
   a second tube including first and second open ends spaced along a second longitudinal axis, with the second tube defining a second conduit between the first and second open ends thereof, and
   a second pivotal connector mounting the first open end of the second tube to the second open end of the first tube about a second pivot axis perpendicular to the pivot plane and parallel to and spaced from the first pivot axis, with relative movement between the first and second tubes being limited to the pivot plane with the second longitudinal axis located in the pivot plane, with the first open end of the second tube pivotable about the second pivot axis relative to the second open end of the first tube at an obtuse angle to each of the two sides of the second open end of the first tube, with the second pivotal connector defining a second passage adapted to receive the hose, with the hose adapted to extend through the first and second conduits defined by the first and second tubes and the first and second passages defined by the first and second pivotal connectors, with another end of the hose adapted to output paving material from the cabinet, with the second pivotal connector including:
   first and second tabs each including an inner end fixed to the second open end of the first tube and an outer end spaced from the first open end of the second tube and the second open end of the first tube, with the inner ends of the first and second tabs spaced in a first direction parallel to the second pivot axis, with the outer ends of the first and second tabs spaced along the second pivot axis;
   third and fourth tabs each including an inner end fixed to the first open end of the second tube and an outer end spaced from the first open end of the second tube and the second open end of the first tube, with the inner ends of the third and fourth tabs spaced in the first direction parallel to the second pivot axis, with the outer ends of the third and fourth tabs spaced along the second pivot axis, with the outer ends of the first and second tabs intermediate the outer ends of the third and fourth tabs along the second pivot axis;

a first pin extending through the outer ends of the first and third tabs, with relative movement between the outer ends of the first and third tabs being limited to the pivot plane; and a second pin extending through the outer ends of the second and fourth tabs, with relative movement between the outer ends of the second and fourth tabs being limited to the pivot plane, with the first and second pins spaced along the second pivot axis.

16. The hose holder boom assembly as claimed in claim 15, with the inner end of each of the first and second tabs fixed to an inner periphery of the second open end of the first tube, with the inner end of each of the third and fourth tabs fixed to an inner periphery of the first open end of the second tube, and with the second passage defined between the inner ends of the first, second, third and fourth tabs and between the first and second pins.

17. The hose holder boom assembly as claimed in claim 16, with the outer end of the first tab including a first opening, with the outer end of the second tab including a second opening aligned with the first opening, with the outer end of the third tab including a third opening aligned with the first opening, with the outer end of the fourth tab including a fourth opening aligned with the second opening, with the second pivotal connector further including:

a first bushing received in the first opening and including a first central bore;

a second bushing received in the second opening and including a second central bore aligned with the first central bore;

a third bushing received in the third opening and including a third central bore aligned with the first central bore, with the first pin extending through the first and third central bores; and a fourth bushing received in the fourth opening and including a fourth central bore aligned with the second central bore, with the first and second bushings intermediate the third and fourth bushings along the second pivot axis, with the second pin extending through the second and fourth central bores.

18. The hose holder boom assembly as claimed in claim 17, with the second pivotal connector further including:

a first gusset including a first end fixed to the second open end of the first tube and a second end fixed to the first bushing;

a second gusset including a first end fixed to the second open end of the first tube and a second end fixed to the second bushing, with the first and second tabs intermediate the first and second gussets in the first direction parallel to the second pivot axis;

a first plate including a first end fixed to an outer periphery of the first open end of the second tube and a second end fixed to the third bushing; and a second plate including a first end fixed to the outer periphery of the first open end of the second tube and a second end fixed to the fourth bushing, with the third and fourth tabs intermediate the first and second plates in the first direction parallel to the second pivot axis.

19. The hose holder boom assembly as claimed in claim 18, with the sidewall including a hole through which the hose extends out of the cabinet, with the first pivotal connector including:

fifth and sixth tabs each including an inner end fixed to an inner periphery of the hole of the sidewall and an outer end spaced from the first open end of the first tube and the sidewall, with the inner ends of the fifth and sixth tabs spaced in a second direction parallel to the first pivot axis, with the outer ends of the fifth and sixth tabs spaced along the first pivot axis;

seventh and eighth tabs each including an inner end fixed to the first open end of the first tube and an outer end spaced from the first open end of the first tube and the sidewall, with the inner ends of the seventh and eighth tabs spaced in the second direction parallel to the first pivot axis, with the outer ends of the seventh and eighth tabs spaced along the first pivot axis, with the outer ends of the fifth and sixth tabs intermediate the outer ends of the seventh and eighth tabs along the first pivot axis;

a third pin extending through the outer ends of the fifth and seventh tabs, with movement of the outer end of the seventh tab relative to the outer end of the fifth tab being limited to the pivot plane; and a fourth pin extending through the outer ends of the sixth and eighth tabs, with movement of the outer end of the eighth tab relative to the outer end of the sixth tab being limited to the pivot plane, with the third and fourth pins spaced along the first pivot axis.

\* \* \* \* \*